(12) United States Patent
Wammock

(10) Patent No.: US 10,034,454 B2
(45) Date of Patent: Jul. 31, 2018

(54) FERAL HOG FEEDER ASSEMBLY

(71) Applicant: Johnny E. Wammock, St. Petersburg, FL (US)

(72) Inventor: Johnny E. Wammock, St. Petersburg, FL (US)

(*) Notice: Subject to any disclaimer, the term of this patent is extended or adjusted under 35 U.S.C. 154(b) by 273 days.

(21) Appl. No.: 14/934,052

(22) Filed: Nov. 5, 2015

(65) Prior Publication Data

US 2016/0183494 A1 Jun. 30, 2016

Related U.S. Application Data

(60) Provisional application No. 62/075,922, filed on Nov. 6, 2014.

(51) Int. Cl.
*A01K 5/00* (2006.01)
*A01K 5/02* (2006.01)
*A01K 5/01* (2006.01)

(52) U.S. Cl.
CPC ............ *A01K 5/025* (2013.01); *A01K 5/0114* (2013.01); *A01K 5/0225* (2013.01); *A01K 5/0233* (2013.01)

(58) Field of Classification Search
CPC ...... A01K 5/00; A01K 5/0114; A01K 5/0225; A01K 5/0233; A01K 5/0241; A01K 5/25
USPC ..................... 119/53, 53.5, 54, 55
See application file for complete search history.

(56) References Cited

U.S. PATENT DOCUMENTS

| | | |
|---|---|---|
| 420,168 A | 1/1890 | Rogers |
| 477,724 A | 6/1892 | Whitmore |
| 1,257,399 A | 4/1917 | Robbins |
| 1,257,638 A | 2/1918 | Robbins |
| 1,283,464 A | 11/1918 | Brown et al. |
| 1,444,428 A | 8/1919 | Robbins |
| 1,530,101 A | 10/1923 | Ashing |
| 2,123,606 A | 6/1936 | Latocha |
| 2,416,825 A | 3/1947 | Dowling |
| 2,534,608 A | 12/1950 | Lasater |
| 2,552,660 A | 5/1951 | Baker |
| 2,560,828 A | 7/1951 | Spivey |
| 2,814,271 A | 3/1957 | Black |
| 2,791,201 A | 5/1957 | Jacbo |
| 3,009,443 A | 11/1961 | McCabe |
| 3,040,707 A | 6/1962 | Shrimplin |
| 3,301,219 A | 1/1967 | Hellekson |

(Continued)

FOREIGN PATENT DOCUMENTS

| | | |
|---|---|---|
| DE | 3526615 | 1/1987 |
| DE | 10065163 | 12/2000 |

*Primary Examiner* — David J Parsley

(57) ABSTRACT

A feral hog feeder assembly includes a housing having an opening therein and a door closing the opening. A hopper positioned within the housing is in communication with a receiver that retains food material from the hopper. A food release is mounted to the housing and is in communication with the hopper. The food release is movable to an open condition placing the hopper in an open position or in a closed condition placing the hopper in a closed position. The food release includes a floor pan for walking upon by an animal and which extends through the opening. A stop attached to the food release apparatus and engages the door when the food release is in the opened condition and disengages from the door when the food release is in the closed condition. A plurality of spacers on the floor pan prevents access to the housing by non-hoofed animals.

15 Claims, 9 Drawing Sheets

(56) References Cited

U.S. PATENT DOCUMENTS

| | | | |
|---|---|---|---|
| 3,575,141 A | | 4/1971 | Elkins |
| 3,951,107 A | | 4/1976 | Doty |
| 4,582,023 A | * | 4/1986 | Zumbahlen .......... A01K 5/0241 |
| | | | 119/53.5 |
| 4,911,727 A | | 3/1990 | King |
| 4,982,698 A | | 1/1991 | Sollars |
| 5,146,872 A | | 9/1992 | Waldner |
| 5,243,930 A | | 9/1993 | Rahm |
| 5,558,039 A | | 9/1996 | Zimmerman |
| 5,570,656 A | | 11/1996 | Waldner et al. |
| 5,595,139 A | | 1/1997 | Hofer et al. |
| 5,613,464 A | | 3/1997 | Petzel |
| 5,794,561 A | * | 8/1998 | Schulz ................ A01K 5/0225 |
| | | | 119/52.1 |
| 6,253,705 B1 | | 7/2001 | Pollock et al. |
| 6,446,574 B2 | | 9/2002 | Bickley |
| 7,891,317 B2 | * | 2/2011 | Bodenstab .......... A01K 5/0225 |
| | | | 119/51.01 |
| 8,448,602 B2 | | 5/2013 | Lytle |
| 2008/0029036 A1 | | 2/2008 | Guardia |
| 2008/0060582 A1 | | 3/2008 | Painter |

* cited by examiner

FERAL HOG FEEDER ASSEMBLY

CROSS-REFERENCE TO RELATED APPLICATIONS

This application is takes the benefit of previously filed U.S. Provisional Application 62/075,922 filed on Nov. 6, 2014.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM (EFS-WEB)

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art Including Information Disclosed Under 37 CFR 1.97 and 1.98

The disclosure relates to animal feeding devices and hog feeding devices and more particularly pertains to a new hog feeding device for providing feed to be provided to a wild hog while preventing other animals from accessing the feed.

BRIEF SUMMARY OF THE INVENTION

An embodiment of the disclosure meets the needs presented above by generally comprising a housing that includes a front wall having an opening therein for accessing an interior of the housing. A door is hingedly coupled to the housing and is positioned in the opening for closing the opening. A hopper is positioned within the housing. A receiver is mounted within the housing and receives food material from the hopper when the hopper is in an open position. A food release is mounted to the housing and is in communication with the hopper. The food release is movable to an open condition placing the hopper in the open position or in a closed condition placing the hopper in a closed position. The food release includes a floor pan for walking upon by an animal. The floor pan extends through the opening and the food release is biased into the open condition. A stop is attached to the food release apparatus and engages the door when the food release is in the opened condition to inhibit opening of the door to prevent access to the receiver. The stop disengages the door when the food release is in the closed condition to allow opening of the door and access to the receiver. A plurality of spacers defining bear bars traverses the floor pan. The spacers is elongated and oriented parallel to each other. The spacers is configured to prevent animals has a selected paw size from urging the food release downward into the closed condition.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
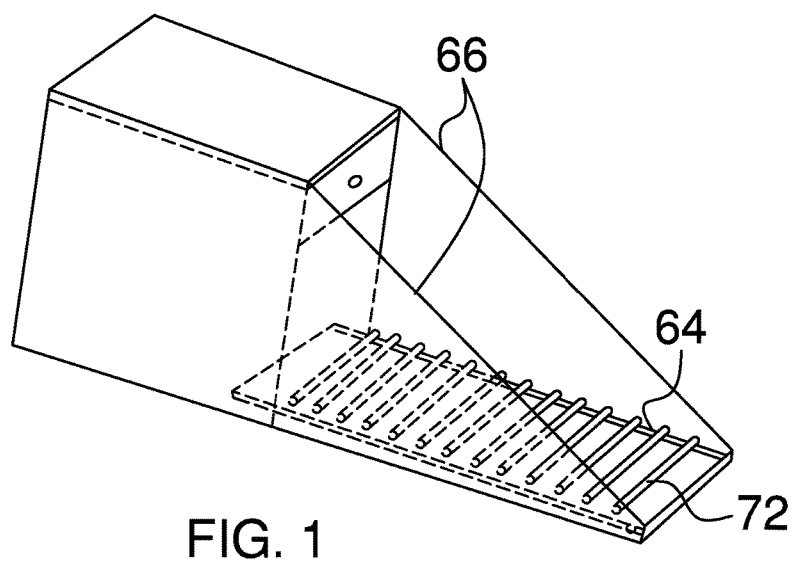
FIG. 1 is a front perspective view of a feral hog feeder assembly according to an embodiment of the disclosure.
Figure 2:
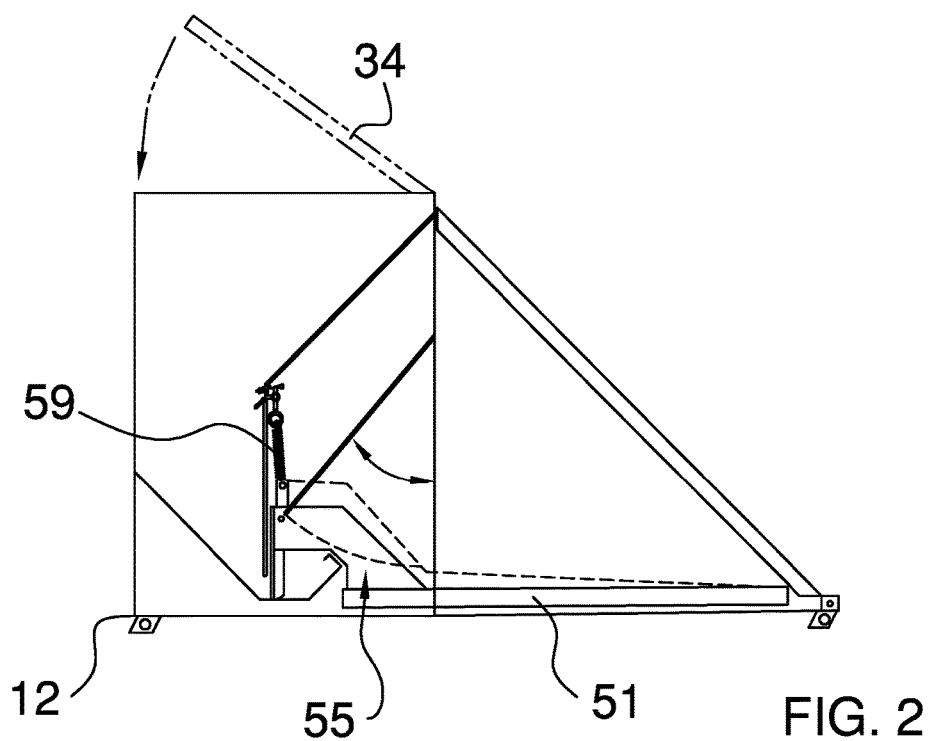
FIG. 2 is a side broken view of an embodiment of the disclosure.
Figure 3:
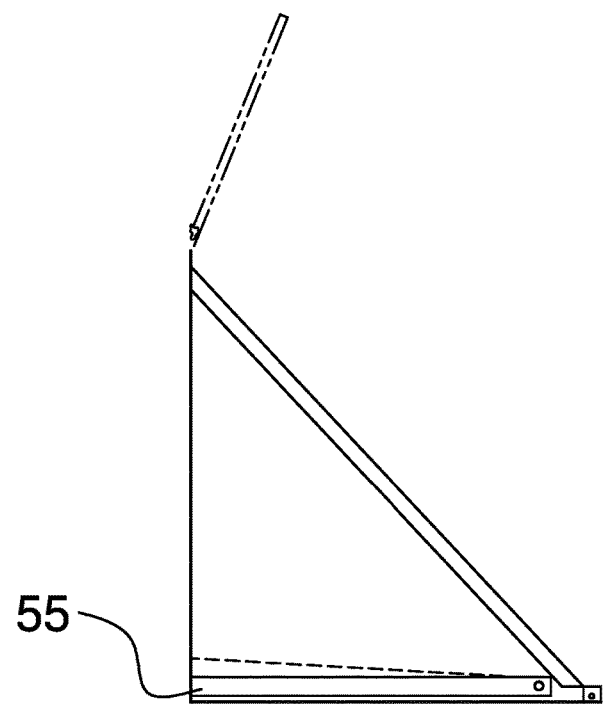
FIG. 3 is a side broken view of an embodiment of the disclosure.
Figure 4:
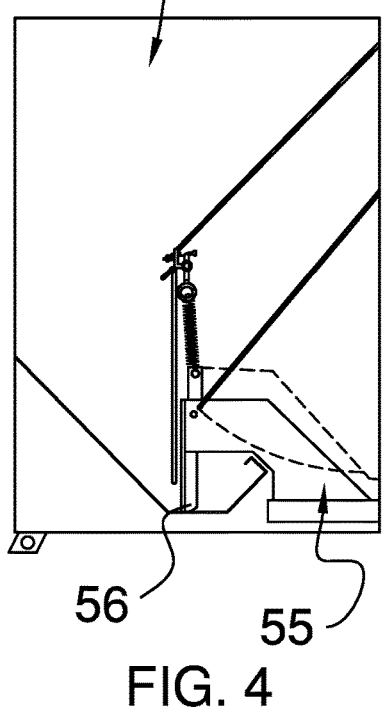
FIG. 4 is a side broken view of an embodiment of the disclosure.
Figure 5:
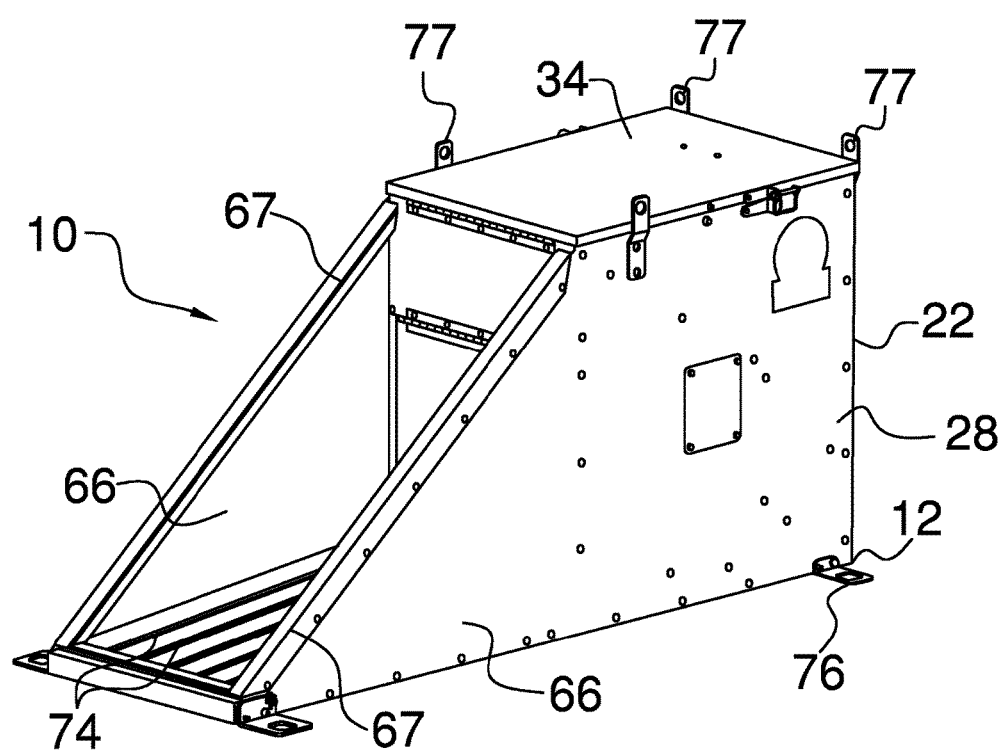
FIG. 5 is a front perspective view of an embodiment of the disclosure.
Figure 6:
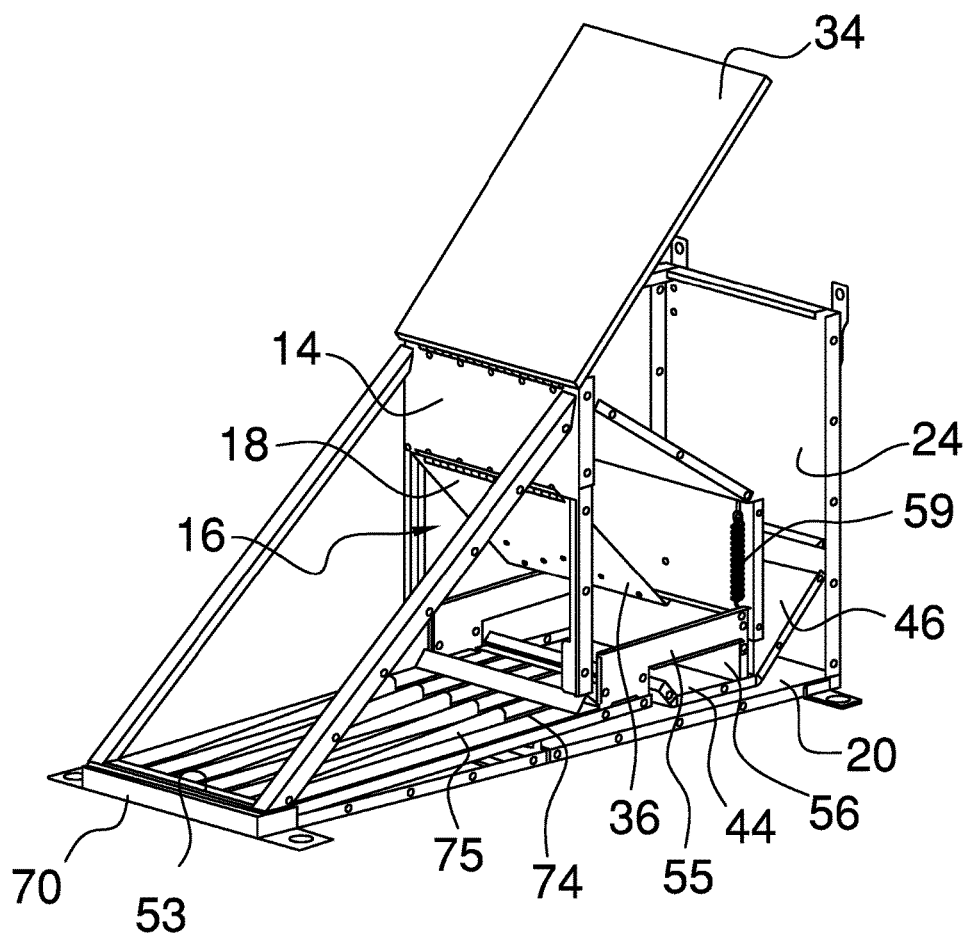
FIG. 6 is a front perspective view of an embodiment of the disclosure having outer walls removed.
Figure 7:
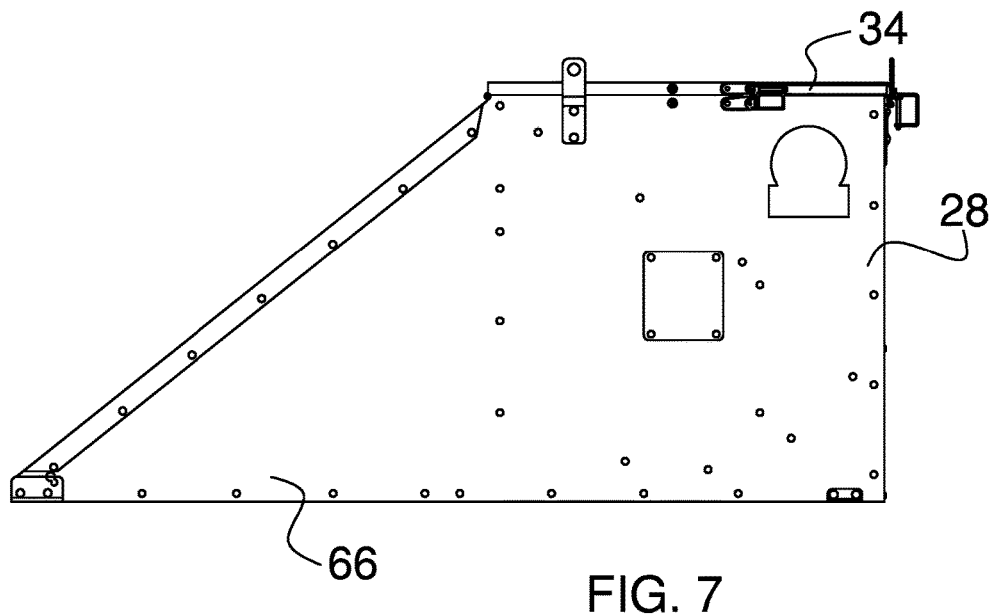
FIG. 7 is a right side view of an embodiment of the disclosure.
Figure 8:
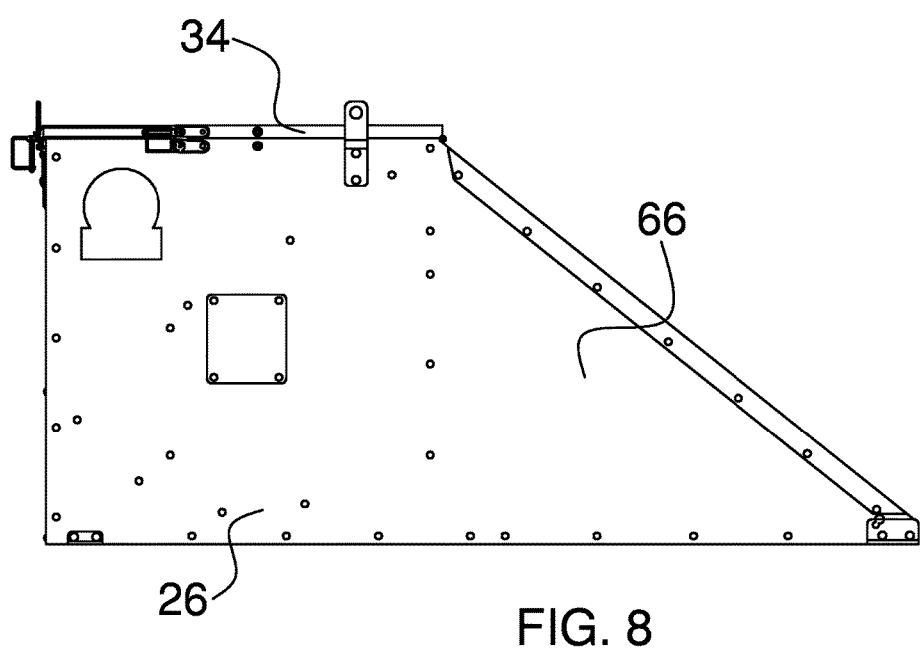
FIG. 8 is a left side view of an embodiment of the disclosure.
Figure 9:
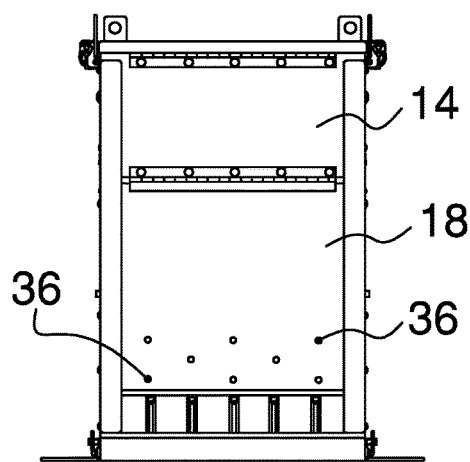
FIG. 9 is a front view of an embodiment of the disclosure.

With reference now to the drawings, and in particular to FIGS. 1 through 14 thereof, a new hog feeding device embodying the principles and concepts of an embodiment of the disclosure and generally designated by the reference numeral 10 will be described.

As best illustrated in FIGS. 1 through 6, the feral hog feeder assembly 14 generally comprises a housing 12 including a front wall 14 having an opening 16 therein for accessing an interior of the housing 12. A door 18 is hingedly coupled to the housing 12 and is positioned in the opening 16 for closing the opening 16. The housing 12 more generally includes a bottom wall 20 and a perimeter wall 22 that is attached to and extends upwardly from the bottom wall 20. The perimeter wall 22 includes the front wall 14, a rear wall 24, a first side wall 26 and a second side wall 28. The door 18 has an upper edge 30 and a lower edge 32 wherein the upper edge 30 is hingedly coupled to the front wall 14. The door 18 is movable inwardly of the housing 12 to access an interior of the housing 12 through the opening 16. A top wall 34 is positioned on and covers a top side of the housing 12 and may be openable relative to the housing 12. Further, the top wall 34 is hingedly coupled to the perimeter wall 22. As can be seen in the Figures, the door 18 may include apertures 36 extending therethrough to allow odors of food material within the housing 12 to move outwardly of the housing 12 to attract feral pigs.

Figure 10:
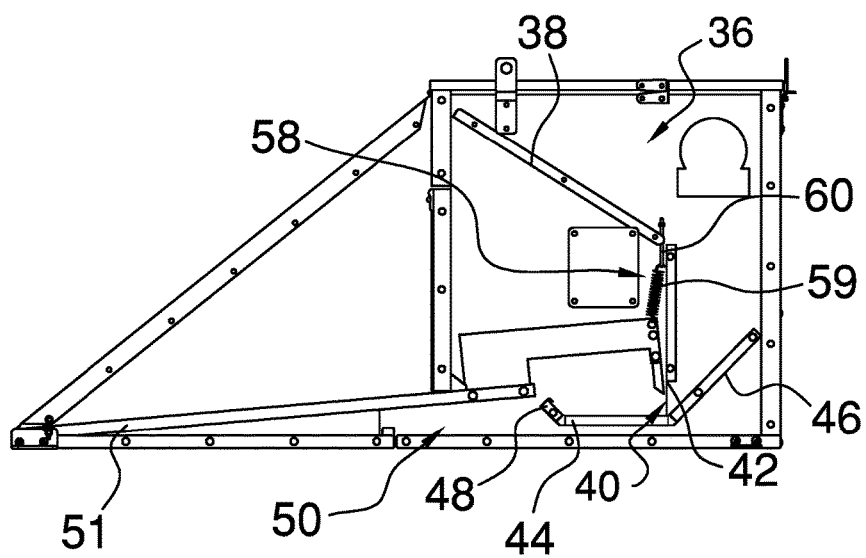
FIG. 10 is a side view of an embodiment of the disclosure having outer walls removed.
Figure 11:
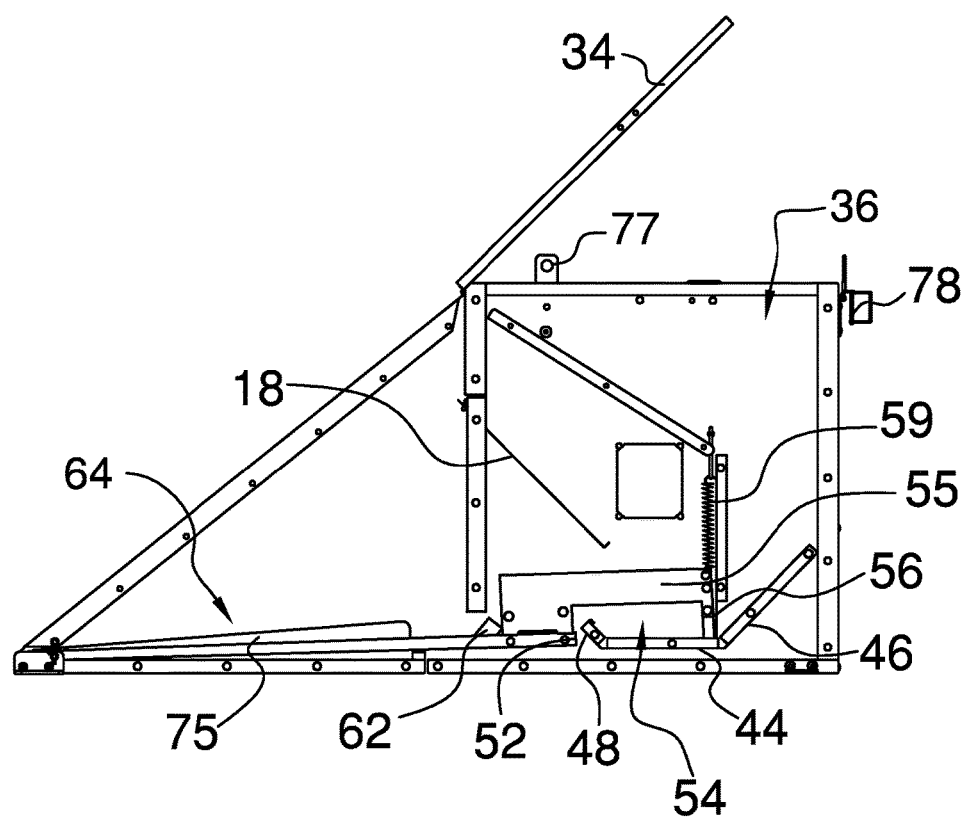
FIG. 11 is a side view of an embodiment of the disclosure having outer walls removed.
Figure 12:
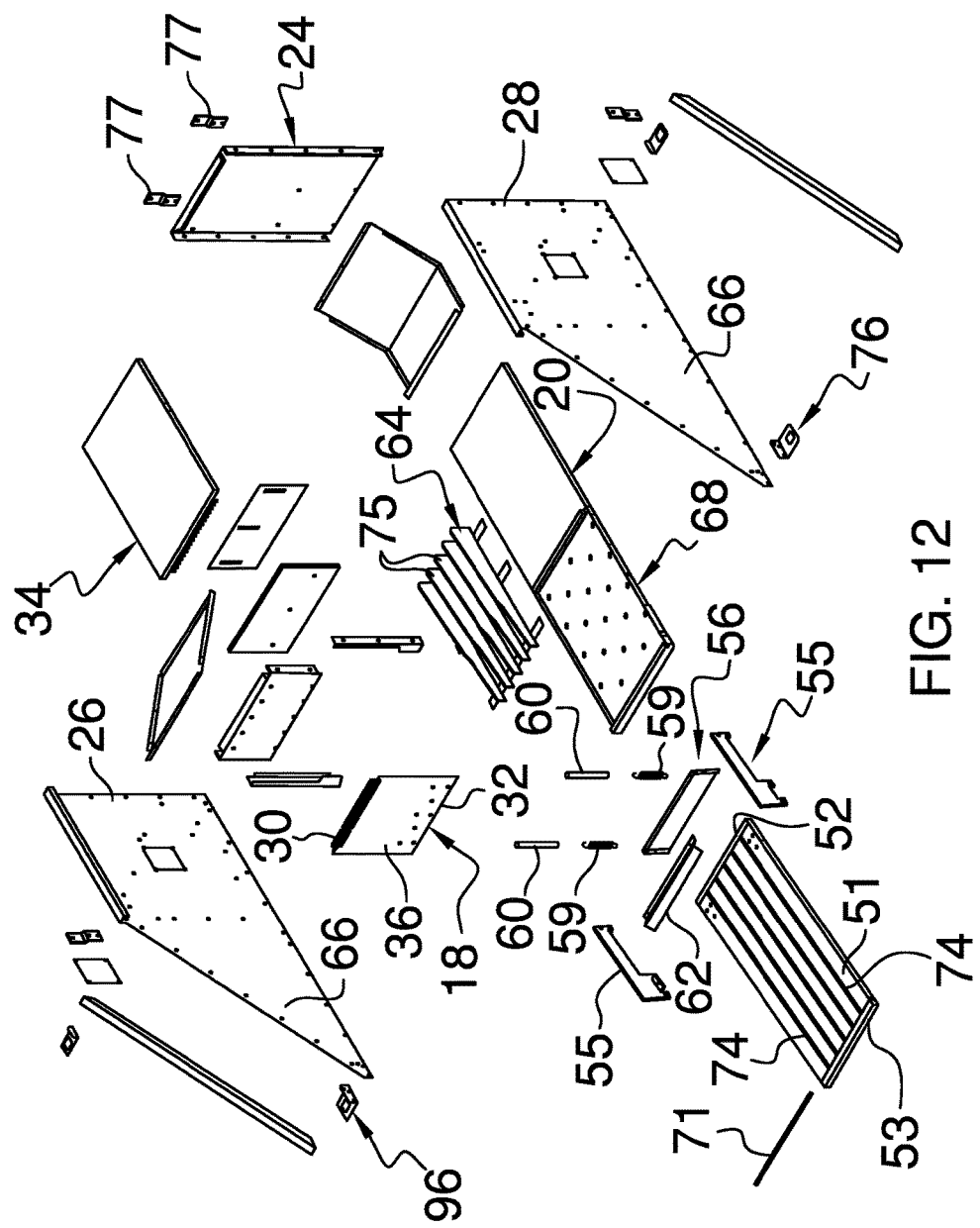
FIG. 12 is a perspective exploded view of an embodiment of the disclosure.
Figure 13:
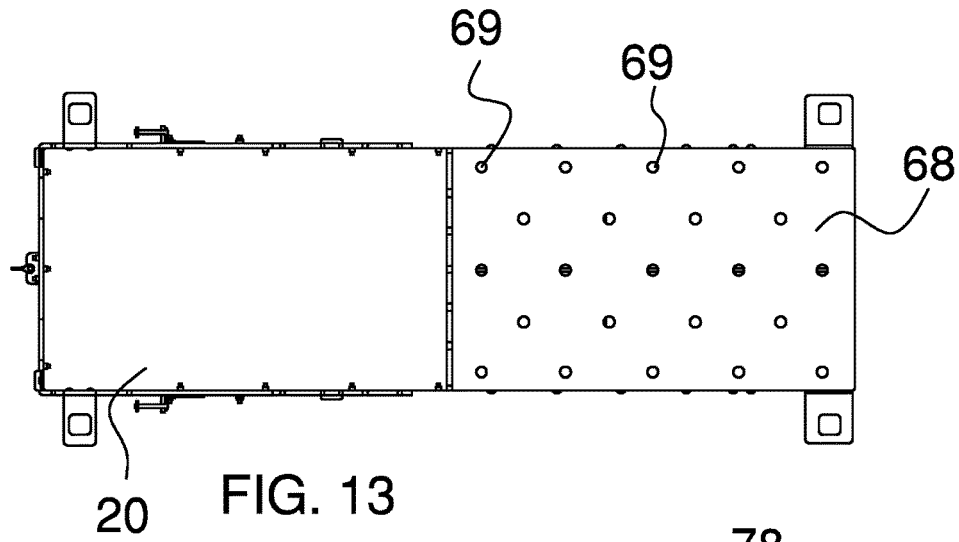
FIG. 13 is a bottom view of an embodiment of the disclosure having outer walls removed.
Figure 14:
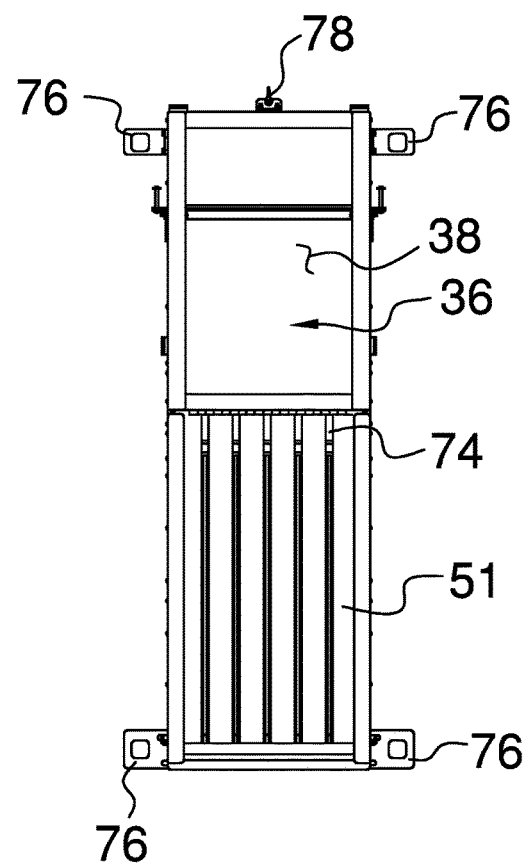
FIG. 14 is a top view of an embodiment of the disclosure having a top wall thereof removed.

A hopper 36 is positioned within the housing 12 adjacent to the rear wall 24. Generally, the hopper 36 is defined between a dividing wall 38 positioned within the housing 12 and an upper edge of the housing 12. The dividing wall 38 extends between the first 26 and second 28 side walls. A spillway 40 is defined between a lowermost edge 42 of the dividing wall 38 and the bottom wall 20. A receiver 44 is mounted within the housing 12 and receives the food material from the hopper 36 when the hopper 36 is in an open position as shown in FIG. 10. A slide 46 extends through the through the spillway 40 and is angled downwardly from the rear wall 24 toward the front wall 14. The slide 46 is configured to allow the food material to move from the hopper 36 toward the opening 16. The receiver 44 is positioned between the slide 46 and the opening 16 and is attached to the slide 46. The receiver 44 has a proximal end relative to the opening 16 which is formed into a lip 48 extending upwardly to inhibit the food material from falling off of the receiver 44. It should be understood that the receiver 44 may comprise a basin for receiving the food material or an area within the housing 12 and outside and below of the hopper 36.

A food release 50 is utilized to open or close the spillway 40. The food release 50 is mounted to the housing 12 and is in communication with the hopper 36. The food release 50 is movable to an open condition placing the hopper 36 in the open position or in a closed condition placing the hopper 36 in a closed position. The food release 50 includes a floor pan 51 for walking upon by an animal. The floor pan 51 extends through the opening 16 and the food release 50 is biased into the open condition. More particularly, the floor pan 51 extends through the opening 16 such that it has an internal end 52 positioned within the housing 12 adjacent to the receiver 44 and an external end 53 positioned outside of the housing 12. The food release 50 includes a closure 54 that is attached to the floor pan 51 adjacent to the internal end 52 and which is alternatingly positionable in a lowered position closing the spillway 40 or in a raised position opening the spillway 40. The food release 50, or more particularly the closure 54, further includes a bracket 55 and a plate 56. The bracket 55 is attached to the floor pan 51 adjacent to the internal end 52 and the plate 56 is attached to the bracket 55 distal to the floor pan 51. The bracket 55, the plate 56 and the floor pan 51 are static with respect to each other such that the bracket 55 and the plate 56 each move vertically in unison with the internal end 52. As can be seen in the Figures, a pair of brackets 55 may be utilized and positioned on opposite edges of the floor pan 51. The plate 56 is movable downwardly to the closed position abutting the receiver 44 and closing the spillway 40 or upwardly in the open position exposing the spillway 40. In this manner, when the floor pan 51 is stepped upon the spillway 40 is closed so that an animal feeding on the food material has access only to that food material which has fallen onto the receiver 44 as the hopper 36 will be shut off from the receiver 44.

The food release 50 further includes a biasing member 58 that is attached to the food release 50 and biases the plate 56 into the open position. The biasing member 58 biases the internal end 52 upwardly. Weight positioned on the floor pan 51 between the internal 52 and external 53 ends urges the internal end 51 downwardly and the plate 56 into the closed position. The biasing member 58 may comprise a spring 59 having a first end attached to the housing 12 and a second end attached to the food release 50 and more particularly to the bracket 55. The spring 59 may be attached to the housing 12 by way of a threaded rod 60 wherein the distance between the rod 60 and the food release 50 may be adjusted to adjust the amount of force required to be positioned on the floor pan 51 to cause the food release 50 to move the closed condition. Generally it is expected that at least 70.0 lbs of force be required on the floor pan 51 adjacent to the housing 12 to overcome the tension of the spring (or springs) and allow the food release 50 to move to the closed condition.

A stop 62 is attached to the food release 50 and engages the door 18 when the food release 50 is in the opened condition to inhibit opening of the door 18 to prevent access to the receiver 44 while the spillway 40 is open. The stop 62 disengages the door 18 when the food release 50 is in the closed condition to allow opening of the door 18 and access to the receiver 44. The stop 62 is attached to an upper surface of the floor pan 61 and is positioned within the housing 12. The door 18 engages, or abuts, the stop 62 when the floor pan 51 is in the raised position such that the door 18 is inhibited from moving into the housing 12 to allow access to the receiver 44. The door 18 is pivotable inward of the housing when the stop 62 is moved downwardly with the floor pan 51. Thus, access to the receiver 44 is only achieved when enough weight is placed upon the floor pan 51 so that the door 18 can clear the stop 62 while simultaneously the plate 56 closes the spillway 40.

A plurality of spacers 64 is provided and defines bear bars that traverse the floor pan 51. The term "bear bars" is utilized to emphasize that the function of the spacers 64 is primarily to prevent bears from having access to the receiver 44 though other, non-hoofed animals would likewise also be prevented access to the food material. The spacers 64 are elongated and oriented parallel to each other. The spacers 64 are configured to prevent animals having a selected paw size from urging the food release 50 downward into the closed condition. Generally speaking, the spacers 64 are spaced from each other a distance less than 4.0 inches and greater than 2.0 inches and specifically the distance between the spacers may be 3.5 inches. The spacers 64 may be provided in multiple forms as discussed more fully below.

A pair of lateral walls 66 is attached to the housing 12 and extends forwardly thereof. Each of the lateral walls 66 is associated within one of the first 26 and second 28 side walls and each of the lateral walls 66 may be co-planar with the associated one of the first 26 and second 28 side walls. The floor pan 51 is positioned between the lateral walls 66. The lateral walls 66 prevent animals who typically locate food by site from seeing the door 18 or other animals feeding therein. The lateral walls 66 each have a top edge 67 that may be angled downwardly as the lateral walls 66 extend away from the housing 12. A base 68 is attached to the housing 12 adjacent to the bottom wall 20 and extends forward of the housing 12. The base 68 may have drainage apertures 69 therein. The lateral walls 66 are each attached to and extend upwardly from the base 68. The base 68 has a terminal end 70 positioned opposite of the housing 12. The external end 53 of the floor pan 51 is pivotally coupled to the base 68 adjacent to the terminal end 70 by a rod 71 extending through the base 68 and floor pan 51.

As can be seen in the Figures, the spacers 64 may comprise bars 72, cylindrical or rectangular, that extend between the lateral walls 66. Alternatively, the floor pan 51 is provided with a plurality elongated slits 74 therein extending between the external 53 and internal 52 ends. Each of the spacers 64 is provided as a panel 75 that is attached to the base 68 and extends upwardly such that each panel 75 extends through one slit 74 and wherein each of slits 74 may have one of the spacers 64 therein. Each of the panels 74 is substantially flush with an upper surface of the floor pan 51 when the food release 50 is in the open condition. Substantially flush herein is defined as less than 1.0 inches differential between an apex of the panels 74 and the upper surface of the floor pan 51. The panels 74 increase in height as they move from the terminal end 70 of the base 68 toward the housing 12.

A plurality of securing brackets 76 may be positioned on the housing 12 adjacent to the bottom wall 20 and the base 68 to allow the assembly 10 to be staked down such that it cannot be easily overturned by an animal. Additionally, lifting brackets 77 may be attached to the housing 12 to provide points for receiving hooks and tethers for lifting and transporting the assembly 10.

In use, food material is placed within the hopper 36 by removing or opening the top wall 34 and pouring the food material therein. The top wall 34 is then closed and releasably locked with one or more pins 78 in a conventional manner. The housing 12 is staked down if desired and hoofed animals, such as pigs, are able to step between the spacers 64 such that the food release 50 is actuated to allow the animal to open the door 16 and feed from the receiver 44. While the animal is on the floor pan 51 the hopper 36 is closed off from the receiver 44 to prevent the animal from eating more than intended. When the animal leaves the assembly 10 the food release 50 is moved to the open condition so that food material from the hopper 36 falls again onto the receiver 44. The spacer inhibits large, non-hoofed animals from moving the floor pan 51 while the spring 59 prevents smaller, light weight animals from actuating the assembly 10.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A feral pig feeding assembly comprising:
a housing including a front wall having an opening therein for accessing an interior of said housing, a door being hingedly coupled to said housing and being positioned in said opening for closing said opening;
a hopper being positioned within said housing;
a receiver being mounted within said housing and receiving food material from said hopper when said hopper is in an open position;
a food release being mounted to said housing and being in communication with said hopper, said food release being movable to an open condition placing said hopper in said open position or in a closed condition placing said hopper in a closed position, said food release including a floor pan for walking upon by an animal, said floor pan extending through said opening, said food release being biased into said open condition;
a stop being attached to said food release and engaging said door when said food release is in said opened condition to inhibit opening of said door to prevent access to said receiver, said stop disengaging said door when said food release is in said closed condition to allow opening of said door and access to said receiver;
a plurality of spacers defining bear bars traversing said floor pan, said spacers being elongated and oriented parallel to each other, said spacers being configured to prevent animals having a selected paw size from urging said food release downward into said closed condition;
said housing including a bottom wall and a perimeter wall being attached to and extending upwardly from said bottom wall, said perimeter wall including said front wall, a rear wall, a first side wall and a second side wall, said door having an upper edge and a lower edge, said upper edge being hingedly coupled to said front wall, said door being movable inwardly of said housing to access an interior of said housing through said opening, a top wall being positioned on and covering a top side of said housing, said top wall being openable relative to said housing;
said hopper being positioned within said housing adjacent to said rear wall, said hopper being defined between a dividing wall positioned within said housing and an upper edge of said housing, said dividing wall extending between said first and second side walls, a spillway being defined between a lowermost edge of said dividing wall and said bottom wall, said food release being configured to open or close said spillway; and
a slide extending through said through said spillway and being angled downwardly from said rear wall toward said front wall, said slide being configured to allow the food material to move from said hopper toward said opening, said receiver being positioned between said slide and said opening and being attached to said slide, said receiver having a proximal end relative to said opening forming a lip extending upwardly and being configured to inhibit the food material from falling off of said receiver.

2. The feral pig feeding assembly according to claim 1, wherein said floor pan extending through said opening and having an internal end being positioned within said housing adjacent to said receiver and an external end positioned outside of said housing.

3. The feral pig feeding assembly according to claim 2, wherein said food release includes a closure being attached to said floor pan adjacent to said internal end and being positioned in a lowered position closing said spillway or in a raised position opening said spillway.

4. The feral pig feeding assembly according to claim 3, wherein said closure includes a bracket being attached to said floor pan adjacent to said internal end, a plate being attached to said bracket distal to said floor pan, wherein said bracket, said plate and said floor pan are static with respect to each other such that said bracket and said plate each move vertically in unison with said internal end, said plate being movable downwardly to said closed position abutting said receiver and closing said spillway or upwardly in said open position exposing said spillway.

5. The feral pig feeding assembly according to claim 4, wherein said food release further includes a biasing member being attached to said food release and biasing said plate into said open position, said biasing member biasing said internal end upwardly, wherein weight positioned on said floor pan between said internal and external ends urges said internal end downwardly and said plate into said closed position.

6. The feral pig feeding assembly according to claim 5, wherein said biasing member is adjustable.

7. The feral pig feeding assembly according to claim 3, wherein said stop is attached to an upper surface of said floor pan, said stop being positioned within said housing, said door engaging said stop when said closure is in said raised position such that said door is inhibited from moving into said housing to allow access to said receiver, said door being pivotable inward of said housing when said stop is moved downwardly with said floor pan.

8. The feral pig feeding assembly according to claim 1, wherein said spacers are spaced from each other a distance less than 4.0 inches and greater than 2.0 inches.

9. The feral pig feeding assembly according to claim 1, further including a pair of lateral walls being attached to said housing and extending forwardly thereof, each of said lateral walls being associated within one of said first and second side walls, said floor pan being positioned between said lateral walls.

10. The feral pig feeding assembly according to claim 9, wherein said lateral walls each have a top edge being angled downwardly as said lateral walls extend away from said housing.

11. The feral pig feeding assembly according to claim 9, further including a base being attached to said housing adjacent to said bottom wall and extending forward of said housing, said lateral walls each being attached to and extending upwardly from said base, said base having a terminal end positioned opposite of said housing, an external end of said floor pan being pivotally coupled to said base adjacent to said terminal end.

12. The feral pig feeding assembly according to claim 11, wherein said floor pan has a plurality elongated slits therein, each of said spacers being attached to said base and extending upwardly such that each of said slits has one of said spacers therein, each of said spacers being substantially flush with an upper surface of said floor pan when said food release is in said open condition.

13. A feral pig feeding assembly comprising:
a housing including a front wall having an opening therein for accessing an interior of said housing, a door being hingedly coupled to said housing and being positioned in said opening for closing said opening;
a hopper being positioned within said housing;
a receiver being mounted within said housing and receiving food material from said hopper when said hopper is in an open position;
a food release being mounted to said housing and being in communication with said hopper, said food release being movable to an open condition placing said hopper in said open position or in a closed condition placing said hopper in a closed position, said food release including a floor pan for walking upon by an animal, said floor pan extending through said opening, said food release being biased into said open condition;
a stop being attached to said food release and engaging said door when said food release is in said opened condition to inhibit opening of said door to prevent access to said receiver, said stop disengaging said door when said food release is in said closed condition to allow opening of said door and access to said receiver;
a plurality of spacers defining bear bars traversing said floor pan, said spacers being elongated and oriented parallel to each other, said spacers being configured to prevent animals having a selected paw size from urging said food release downward into said closed condition;
said housing including a bottom wall and a perimeter wall being attached to and extending upwardly from said bottom wall, said perimeter wall including said front wall, a rear wall, a first side wall and a second side wall, said door having an upper edge and a lower edge, said upper edge being hingedly coupled to said front wall, said door being movable inwardly of said housing to access an interior of said housing through said opening, a top wall being positioned on and covering a top side of said housing, said top wall being openable relative to said housing;
a pair of lateral walls being attached to said housing and extending forwardly thereof, each of said lateral walls being associated within one of said first and second side walls, said floor pan being positioned between said lateral walls; and
a base being attached to said housing adjacent to said bottom wall and extending forward of said housing, said lateral walls each being attached to and extending upwardly from said base, said base having a terminal end positioned opposite of said housing, an external end of said floor pan being pivotally coupled to said base adjacent to said terminal end.

14. The feral pig feeding assembly according to claim 13, wherein said floor pan has a plurality elongated slits therein, each of said spacers being attached to said base and extending upwardly such that each of said slits has one of said spacers therein, each of said spacers being substantially flush with an upper surface of said floor pan when said food release is in said open condition.

15. A feral pig feeding assembly comprising:
a housing including a front wall having an opening therein for accessing an interior of said housing, a door being hingedly coupled to said housing and being positioned in said opening for closing said opening;
a hopper being positioned within said housing;
a receiver being mounted within said housing and receiving food material from said hopper when said hopper is in an open position;
a food release being mounted to said housing and being in communication with said hopper, said food release being movable to an open condition placing said hopper in said open position or in a closed condition placing said hopper in a closed position, said food release including a floor pan for walking upon by an animal, said floor pan extending through said opening, said food release being biased into said open condition;

a stop being attached to said food release and engaging said door when said food release is in said opened condition to inhibit opening of said door to prevent access to said receiver, said stop disengaging said door when said food release is in said closed condition to allow opening of said door and access to said receiver;

a plurality of spacers defining bear bars traversing said floor pan, said spacers being elongated and oriented parallel to each other, said spacers being configured to prevent animals having a selected paw size from urging said food release downward into said closed condition; and a base being attached to said housing adjacent to said bottom wall and extending forward of said housing, said base having a terminal end positioned opposite of said housing, an external end of said floor pan being pivotally coupled to said base adjacent to said terminal end, said floor pan having a plurality elongated slits therein, each of said spacers being attached to said base and extending upwardly such that each of said slits has one of said spacers therein, each of said spacers being substantially flush with an upper surface of said floor pan when said food release is in said open condition.

* * * * *